United States Patent [19]

Boyadjieff et al.

[11] 3,921,473

[45] Nov. 25, 1975

[54] TOOL FOR MAKING AND BREAKING PIPE JOINTS

[75] Inventors: George I. Boyadjieff, Anaheim; Andrew B. Campbell, San Marino, both of Calif.

[73] Assignee: Varco International, Inc., Orange, Calif.

[22] Filed: May 2, 1974

[21] Appl. No.: 466,199

[52] U.S. Cl. .............. 81/57.34; 81/57.19; 81/57.21
[51] Int. Cl.² .......................................... B25B 13/50
[58] Field of Search............. 81/57.34, 57.35, 57.33, 81/57.19, 57.21, 57.24, 57.36, 57.39, 57.22; 269/104, 155, 287

[56] References Cited
UNITED STATES PATENTS

| | | | |
|---|---|---|---|
| 2,453,369 | 11/1948 | Grable et al. | 81/57.19 X |
| 3,041,901 | 7/1962 | Knights | 81/57.2 X |
| 3,086,413 | 4/1963 | Mason | 81/57.19 |
| 3,796,418 | 3/1974 | Carlberg | 81/57.19 X |

*Primary Examiner*—James L. Jones, Jr.
*Attorney, Agent, or Firm*—William P. Green

[57] ABSTRACT

A tool for making and breaking pipe joints, including two assemblies for gripping a pair of pipes, and an actuating unit or units for turning these gripping assemblies and the engaged pipes relative to one another, with each gripping assembly including two jaws hinged together for relative opening and closing movement, and with the jaws of the two assemblies having interfitting guide means locating and guiding the jaws of one assembly for rotary movement about the pipe axis relative to the jaws of the other assembly. The jaws of the gripping assemblies carry dies for contacting and holding the pipes, some of which dies are mounted for powered radial movement while others are essentially fixed in the jaws. Preferably, each gripping assembly includes two such radially actuable die units, located in a particular circular spacing with respect to the fixed die or dies, and specifically with the fixed dies being spaced from the movable dies a circular distance greater than the spacing between the movable dies themselves, to thereby optimize the centering effect on a contacted pipe upon actuation of the movable dies.

20 Claims, 15 Drawing Figures

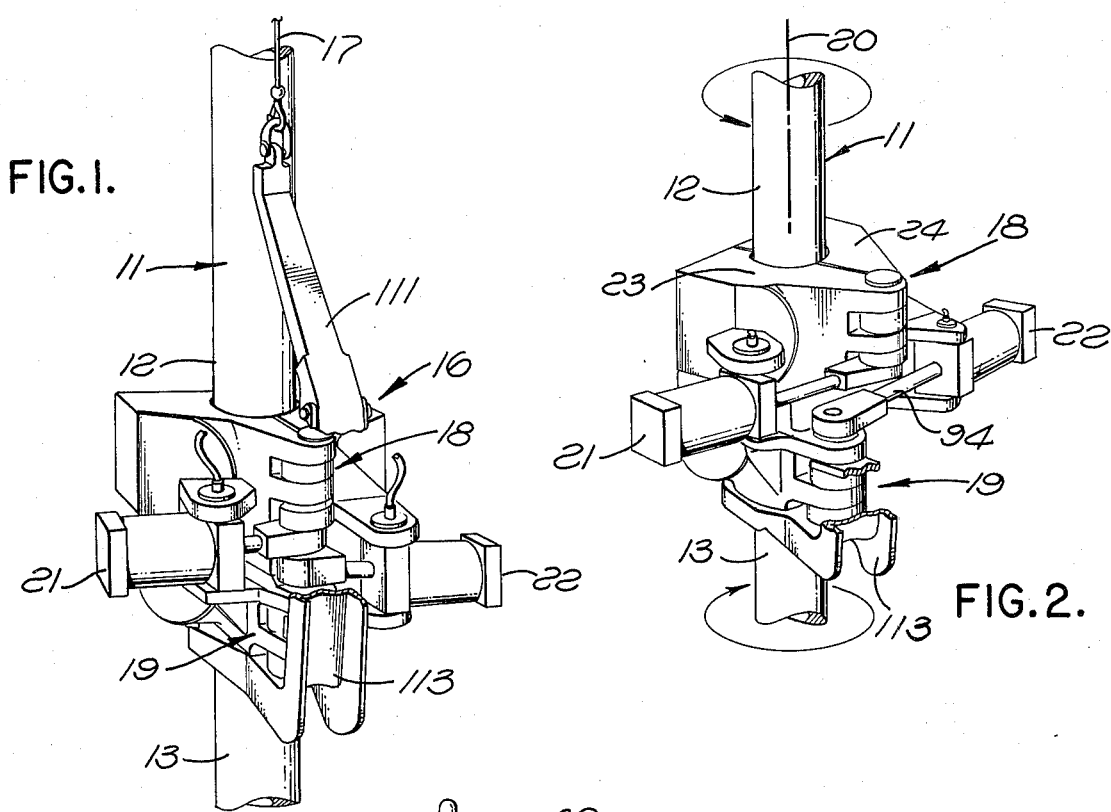
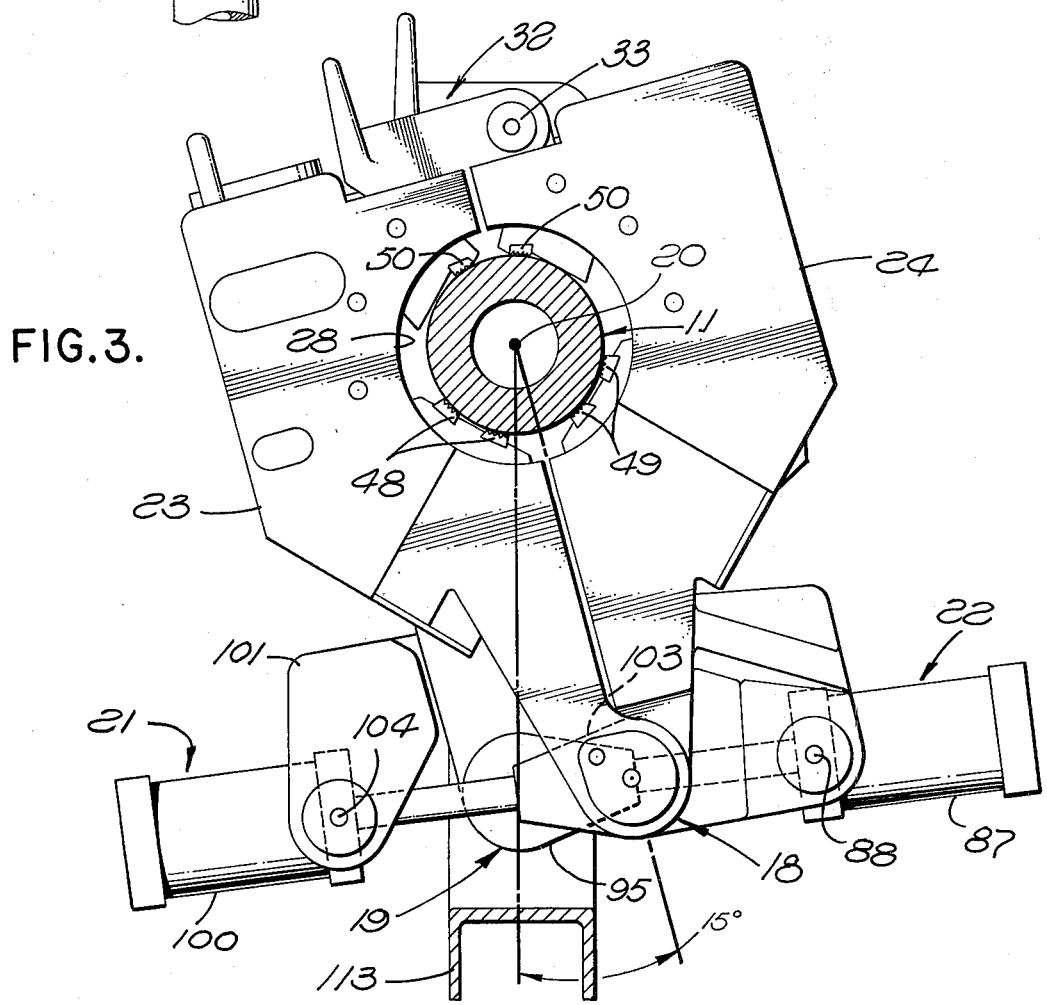

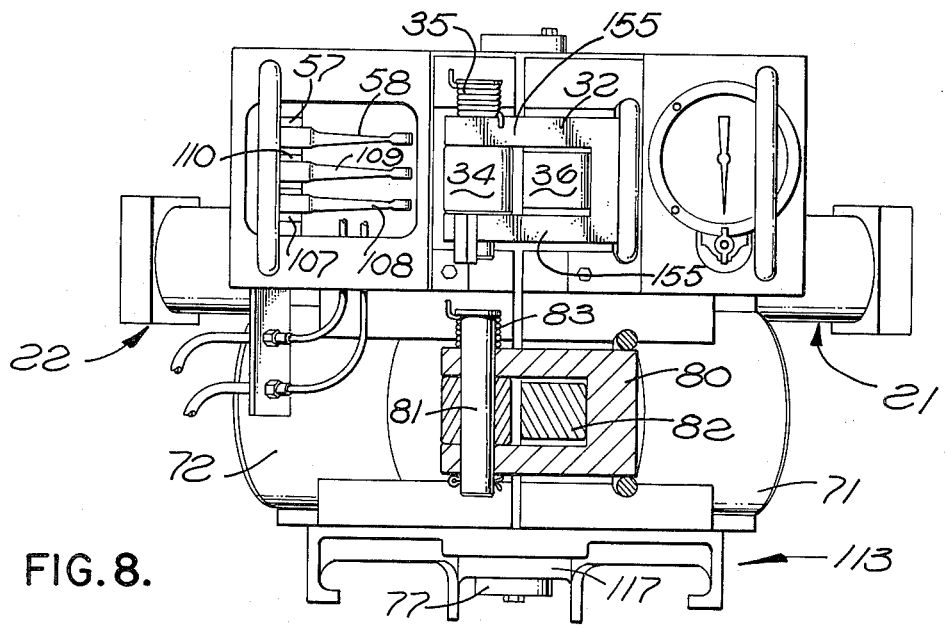
FIG. 8.
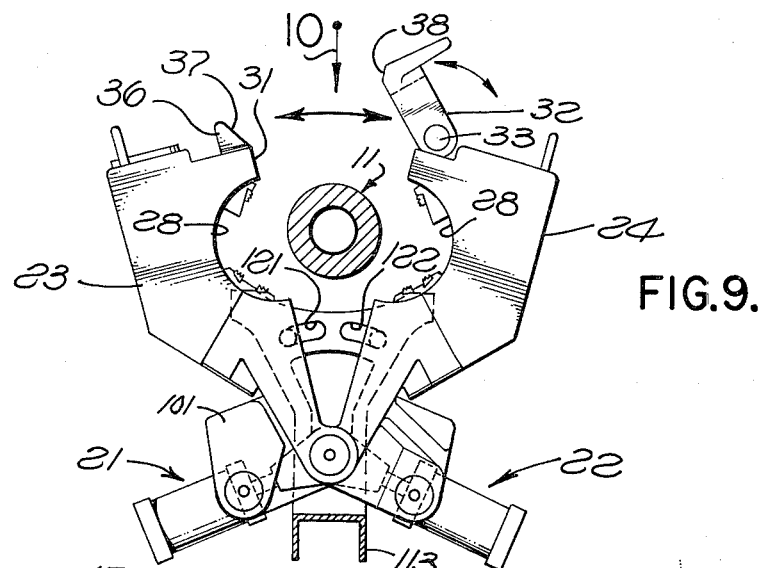
FIG. 9.
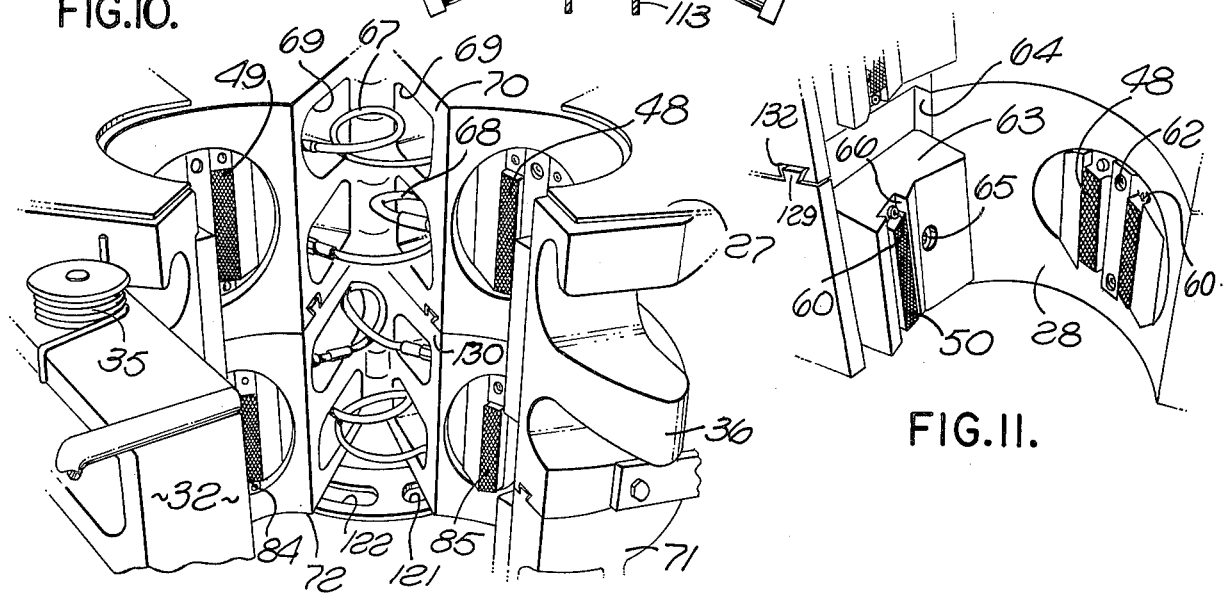
FIG. 10.
FIG. 11.

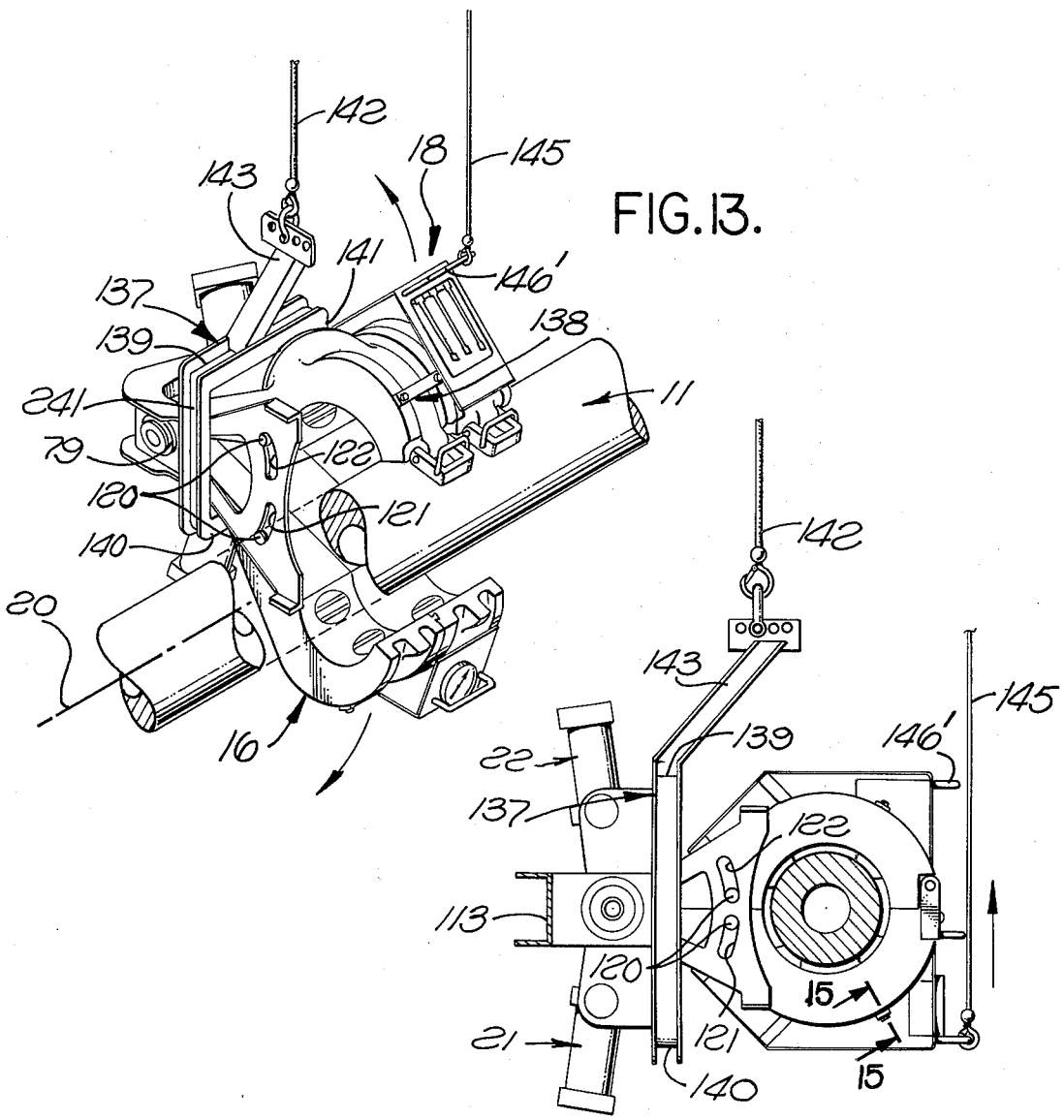
FIG.13.
FIG.14.
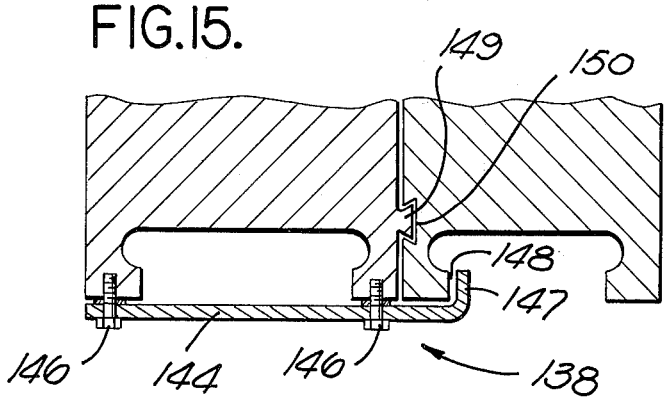
FIG.15.

TOOL FOR MAKING AND BREAKING PIPE JOINTS

CROSS REFERENCE TO RELATED APPLICATION

Certain features of the apparatus disclosed in the present application have been shown and described in a copending application Ser. No. 451,246 filed Mar. 14, 1974, by George W. Haby on "Pipe Joint Make-up or Break-out Tool," which application is owned by the Assignee of the present application.

BACKGROUND OF THE INVENTION

This invention relates generally to improved tools for turning two threaded pipes, such as well pipes, relative to one another, in order to make or break a threaded joint.

In the above identified copending application, there has been disclosed a joint making or breaking tool which includes two gripping assemblies adapted to extend about and grip two aligned threaded pipes, and which includes also one or more actuating units for turning the two gripping assemblies relative to one another about the pipe axis to cause corresponding relative rotary movement of the pipes. The gripping assemblies include jaws which are hinged together for relative swinging movement between open and closed positions, with each actuating unit preferably acting against one of the gripping assemblies at essentially the location of its hinge axis. For contacting the pipes, the jaws carry gripping die elements, some of which are mounted for radial movement into and out of engagement with the pipe, desirably by pressure operated piston and cylinder mechanisms.

SUMMARY OF THE INVENTION

A major object of the present invention is to provide an improved tool which is of the above discussed general type, but in which the jaws of one gripping assembly are more positively and effectively located relative to the jaws of the other gripping assembly than in the arrangement of the discussed copending application. More specifically, the jaws of the two gripping assemblies are so interconnected as to swing between open and closed positions in unison, and in the closed condition to be effectively held in essentially concentric positions whether or not pipes are actually present in the tool. In addition, the interconnection between the jaws of the two gripping assemblies is preferably so designed, and so related to the power operated actuating units for relatively turning the assemblies, that if the jaws are in open condition and the actuating units are then energized to turn the assemblies relative to one another, the initial movement produced by the actuating units will automatically close the jaws to their pipe gripping conditions, thus greatly facilitating the overall operation of the mechanism.

Structurally, the above results are achieved by providing interfitting guide means on the jaws positively guiding the jaws of one gripping assembly for rotary movement relative to the corresponding jaws of the other assembly. These guide means may be formed as interfitting arcuate guide shoulders on the connected parts, desirably including an arcuate rib or projection on one jaw received within an arcuate groove on another jaw.

An additional feature of the present invention relates to a preferred arrangement of movable and fixed pipe contacting dies in the jaw assemblies, so designed as to attain an optimum centering of the pipes within the jaws as the dies are actuated to gripping condition. For this purpose, the dies may include two movable die units actuable by piston and cylinder mechanisms or the like essentially radially of the gripped pipe and between gripping and released conditions, and third essentially fixed die means located circularly between the two movable dies. In order to enable the two movable dies to effectively force a contacted pipe laterally against the fixed die means, the various dies are so located that the circular spacing between each of the movable die units and the fixed die means is greater than the circular spacing between the two movable dies themselves.

BRIEF DESCRIPTION OF THE DRAWINGS

The above and other features and objects of the invention will be better understood from the following detailed description of the typical embodiments illustrated in the accompanying drawings in which:

FIG. 1 is a perspective view, partially broken away, showing a tool embodying the invention as it appears when placed about a well pipe;

FIG. 2 shows the tool of FIG. 1 after the two gripping assemblies have been turned relative to one another in a joint breaking direction;

FIG. 3 is a plan view of the tool in the FIG. 2 condition;

FIG. 8 is a view taken on line 8—8 of FIG. 6;

FIG. 9 is a top plan view similar to FIG. 4, but on a reduced scale and showing the jaws in open condition;

FIG. 10 is a fragmentary front perspective view, taken in the direction of the arrow 10 in FIG. 9;

FIG. 11 is a fragmentary perspective representation of some of the die elements of one of the lower gripping jaws;

FIG. 13 is a perspective view showing variational form of the invention as adapted for use in making or breaking joints in a horizontal pipe;

FIG. 14 is a side view of the tool of FIG. 13, shown in its closed condition; and FIG. 15 is an enlarged section taken on line 15—15 of FIG. 14.

DESCRIPTION OF THE PREFERRED EMBODIMENTS

Figure 6:
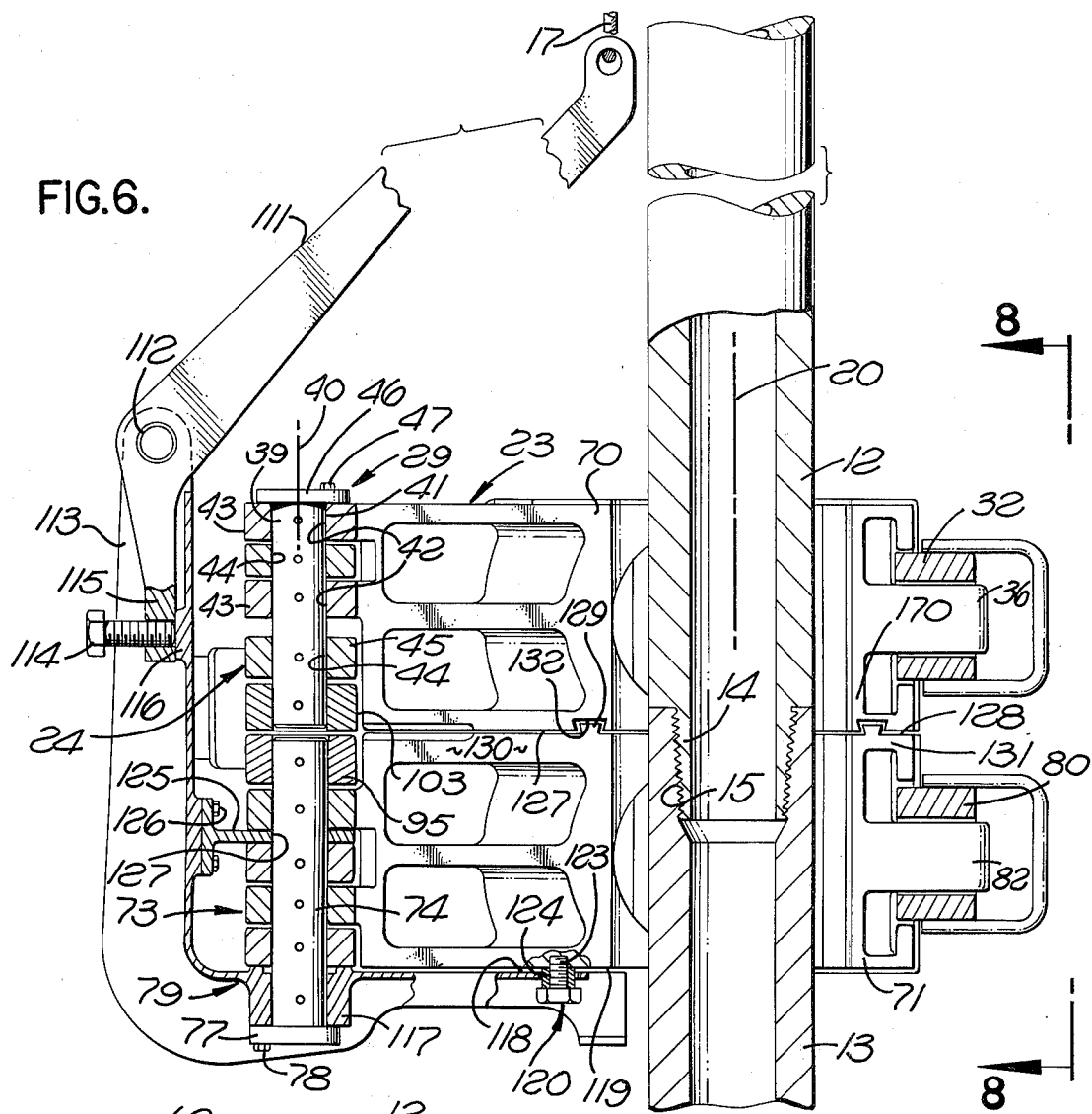
FIG. 6 is a vertical section taken on line 6—6 of FIG. 4.

In FIG. 1, there is represented at 11 a vertically extending well pipe, typically a drill string, having two successive sections or stands 12 and 13 with threadedly interconnected pin and box ends 14 and 15 (see FIG. 6). A tool 16 embodying the invention is to be utilized for either making or breaking the threaded joint between pipes 12 and 13. This tool is suspended on the rig above the rotary table by a suspension line represented at 17 in FIG. 1.

The tool 16 includes two similar gripping assemblies 18 and 19 positioned one above the other and adapted to extend about and grip the ends of the two pipes 12 and 13 respectively. These assemblies are mounted for rotary movement relative to one another about the vertical axis 20 of the pipe by two pressure fluid operated actuating units 21 and 22.

To describe first the structure of the upper gripping assembly 18, this assembly includes two complementary jaws 23 and 24 which may include rigid body castings 25 and 26 partially enclosed within outer sheet metal housings or covers 27. The two jaw bodies 25 and 26 have inner cylindrically curved complementary semicircular surfaces 28 centered about the axis 20 of the pipe to form together a circular opening through which the pipe extends in the FIG. 4 closed condition of the device. The two upper jaw bodies 25 and 26 are attached together by a hinge connection 29 which mounts the body sections for relative swinging movement about a vertical hinge axis 30 between the closed condition of FIG. 4 and the open condition of FIG. 9 in which the outer ends 31 of the jaws are spaced apart a distance greater than the diameter of the pipe to enable the tool to be moved laterally into and out of active position about the pipe. At their outer ends, the jaw bodies carry latch parts for releasably retaining the jaws in closed condition, and typically including a latch element 32 connected by a vertical hinge pin 33 to body 26 of jaw 24. This latch element 32 may be of the U-shaped configuration illustrated in FIG. 8, having spaced upper and lower arms 155 connected pivotally to a lug 34 which projects outwardly from the jaw body 26, with a coil spring 35 being disposed about an upper portion of the hinge pin and acting to normally urge the latch from its FIG. 9 released position to its FIG. 4 latching position. In the FIG. 4 position, the U-shaped latch part is received about an outwardly projecting lug 36 on the second jaw body 25, to hold the jaws closed. Desirably, lug 36 has an inclined camming face 37 which is engageable by a camming surface 38 on latch part 32 in a relation deflecting the latch part 32 to a slightly open condition as the jaws close, and until the latch part 32 reaches a position at which it can swing inwardly under the influence of spring 35 to the locked position of FIG. 4.

Figure 5:
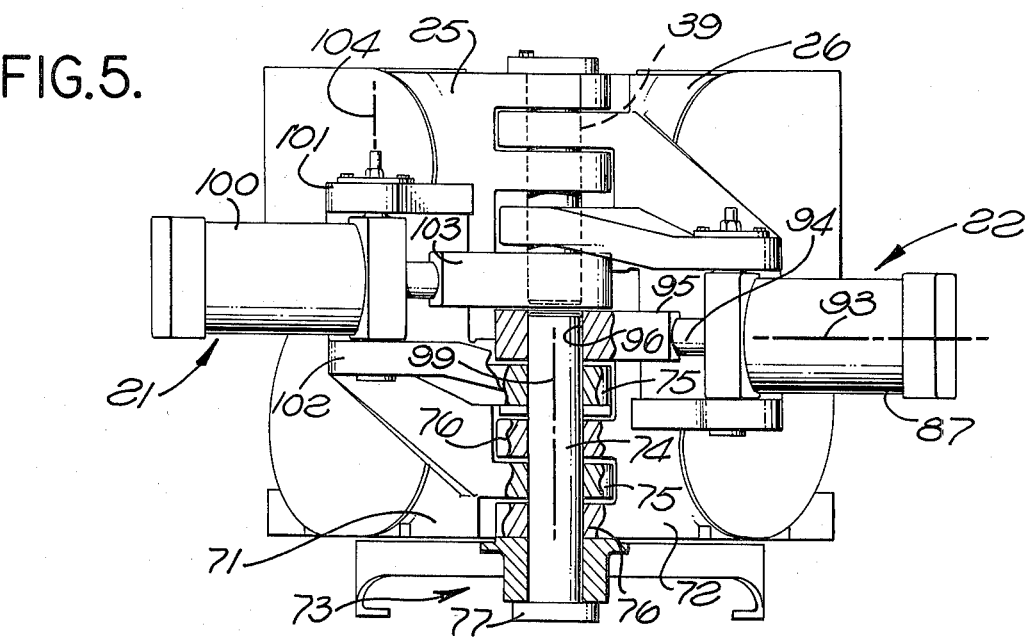
FIG. 5 is a rear plan view, partially broken away, taken essentially on line 5—5 of FIG. 4.

As will be understood best by reference to FIGS. 5 and 6, the hinge connection 29 includes a vertical hinge pin 39, extending along a vertical axis 40 which is parallel to the main vertical axis 20 of the well pipe. Pin 39 has an externally cylindrical shank 41 received within cylindrical openings 42 in two vertically spaced hinge lugs or ears 43 of the jaw 23, and also received within similar cylindrical openings 4 in a pair of vertically spaced hinge lugs 45 of the jaw 24. At its upper end, the hinge pin may have an enlarged head portion 46 attached to the upper hinge lug 43 in suitable manner, as by a screw 47.

Figure 4:
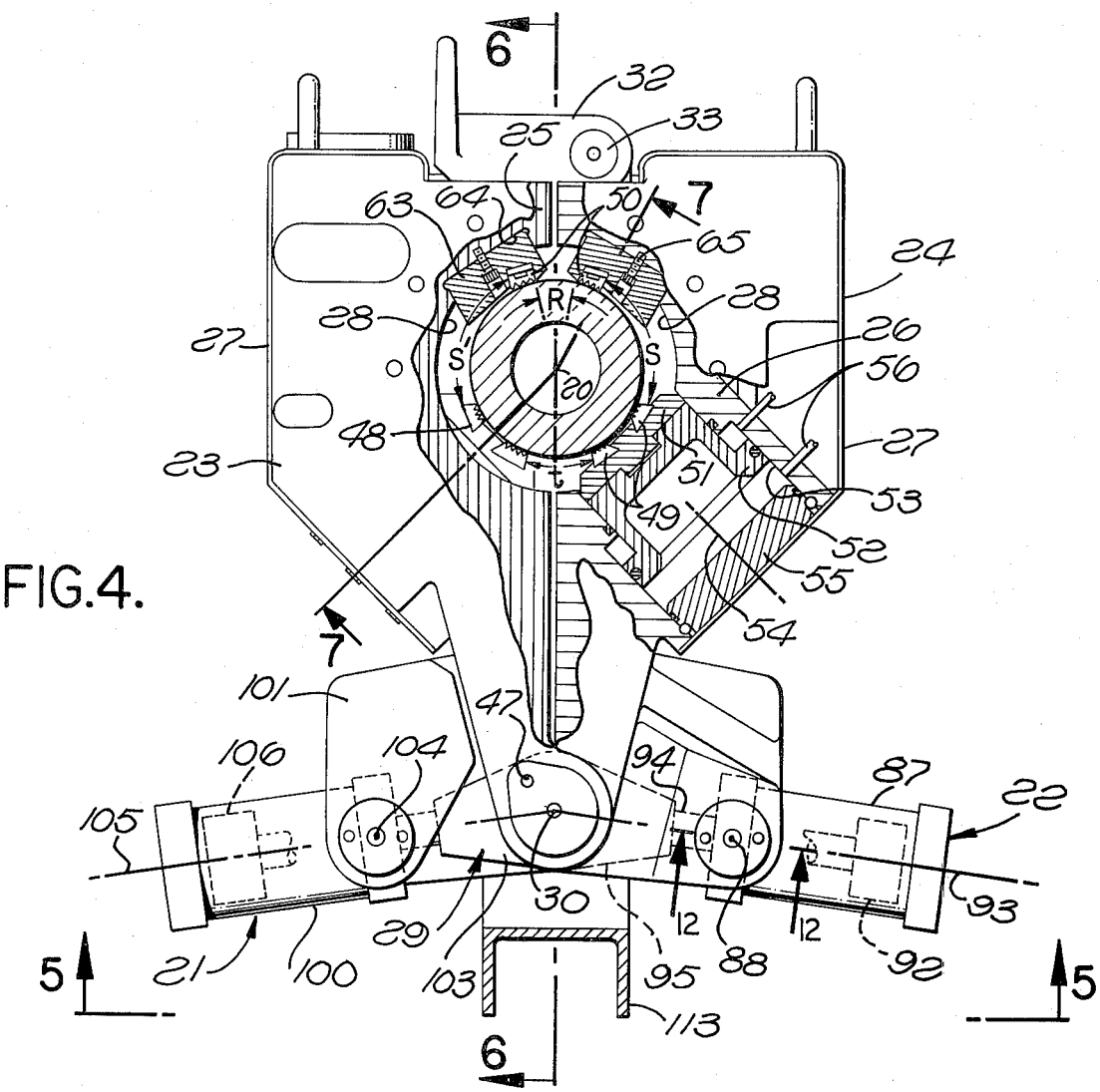
FIG. 4 is a view similar to FIG. 3, but partially broken away, and showing the tool in its FIG. 1 condition.

For actually contacting and gripping the pipe, the upper gripping assembly carries a number of gripping die elements having toothed or otherwise irregularized inner surfaces for contacting and preventing relative movement of the pipe. These dies are desirably arranged in a pattern to form or include what may be considered three die structures or die means, with each of these die means consisting of two die elements. More particularly, as seen in FIG. 4, the dies may include a first radially movable pair of die elements 48 carried by the jaw body 25, a second radially movable pair of die elements 49 carried by the second jaw body 26, and a third pair of essentially fixed or non-radially movable die elements 50 located near the free ends of the jaws and desirably carried separately by the two jaw ends respectively. For producing radial movement of the two die elements 49, these elements may be attached rigidly to a die holder 51 which in turn is attached to a piston 52 mounted within a cylinder recess 53 in body 26 for movement inwardly and outwardly relative to body 26 along an axis 54 extending radially with respect to and intersecting main axis 20 of the pipe. The outer end of the cylinder may be closed appropriately, as by a cylinder end wall 55. Pressure fluid can be supplied to or withdrawn from either end of the cylinder 53 through appropriate pressure supply hoses represented at 56 in FIG. 4 and under the control of a valve represented at 57 (FIG. 8) actuable manually by an operating arm 58.

The second pair of die elements 48 may be identical with the elements 49, and be carried and actuable by a piston 57 (FIG. 7) identical with piston 52 and mounted within a cylinder bore 58. Piston 57 is movable relative to jaw body 25 along an axis 59 which intersects axes 54 and 20 at a common location, and is perpendicular to and extends radially with respect to the pipe axis 20. As seen best in FIG. 7, the die elements 48, 49 and 50 are all preferably elongated axially, and retained within locating grooves in their various carrier parts by end screws 60. The die holder 51 of FIG. 4, and the corresponding die holder 61 of piston 57, may be secured to the pistons by appropriate screws or other fasteners represented at 62 in FIG. 7.

Each of the third pair of die elements 50 is carried rigidly by a holder 63 (FIG. 4), which is located within a recess 64 in the corresponding jaw body 25 or 26, and may be retained therein by screw 65. The die elements 50 may be located within vertical grooves 66 in the parts 63, and be retained therein by a pair of the previously mentioned end screws 60. In the FIG. 4 closed condition of the jaws, the two fixed die elements 50 are received relatively close together, and preferably at the same close spacing as the two dies 49, or the two dies 48. In order to assure effective centering of the pipe within the dies when the two movable pairs of dies 48 and 49 are actuated radially inwardly, it is preferred that the die pairs be spaced apart circularly in essentially the pattern shown in FIG. 4. In particular, it is desirable that the circular spacing $s$ between dies 49 and the nearer of the two dies 50, as well as the corresponding spacing $s'$ between dies 48 and the fixed die 50 which is closer thereto, be substantially greater than the circular spacing $t$ between the nearest portions of the movable dies 48 and 49 themselves. Desirably, each of the circular distances $s$ and $s'$ is at least twice as great as the circular distance $t$, in degrees. Further, the circular distances $s$ and $s'$ should be considerably greater than the spacing $r$ between the two die elements 50, as well as the corresponding spacing between the two dies 48, and the two dies 49, preferably at least about three times as great. As a result of this unique spaced relationship between the various dies, the two movable die sets are able to effectively force the pipe laterally in a direction toward the two fixed dies, for precise centering of the pipe within the dies even though two of the die elements are not movable.

The opposite ends of cylinder chamber 58 within jaw 23 may be connected in parallel to the ends of cylinder chamber 53, so that the two sets of dies 48 and 49 are actuable essentially is unison by operation of the single valve handle 58 of FIG. 8. FIG. 10 shows the manner in which these two cylnders may be connected together, by two coiled flexible hoses 67 and 68, the first of which may be connected at its opposite ends to the outer ends of the two cylinders, while the second hose 68 is connected at its opposite ends to the radially inner ends of the two cylinders. These hoses are coiled as shown and adapted to flex upon opening and closing movement of the jaws, and to be received within opposed recesses 69 in the otherwise adjacent planar vertical surfaces 70 of the jaws in the closed FIG. 4 condition of the jaws.

The lower gripping assembly 19 is in most respects constructed essentially the same as the above discussed upper gripping assembly 18, and in particular includes two jaws 71 and 72 which may be substantially the same as the two upper jaw bodies 25 and 26. In the case of the lower gripping assembly, these jaw bodies 71 and 72 may not be enclosed or covered by housings or partial housings such as those provided at 27 in the upper gripping assembly. The lower jaws 71 and 72 are attached together by a hinge connection 73 similar to the upper hinge connection 29, and including a hinge pin 74 extending through and fitting closely within cylindrical openings in two vertically spaced hinge lugs or loops 75 on jaw 71, and two vertically spaced hinge loops 76 on jaw 72. At its lower end, hinge pin 74 may have an enlarged head 77 (FIG. 6), connected by a screw 78 to the underside of a support plate 79 which will be discussed in greater detail at a later point.

The forward ends of the two jaws 71 and 72 may be releasably retained in closed condition by a latch element 80, corresponding to upper latch part 32, and mounted by a hinge pin 81 to jaw 72 for swinging movement between latched and released positions with respect to a lug 82 formed on jaw 71 and corresponding to lug 36 of the upper latch assembly. A spring 83 corresponding to upper spring 35 urges that latch to its holding position.

The gripping dies carried by lower jaws 71 and 72 correspond exactly to the gripping dies of the upper assembly 18, and are positioned in vertical alignment herewith. In particular, lower jaw 72 carries two gripping dies 84 corresponding to upper dies 49 and connected to and radially actuable by a piston and cylinder mechanism corresponding to that shown at 52, 53, etc. in FIG. 4. Similarly, jaw 71 carries two dies 85 which are radially actuable by a connected piston in the same manner as the corresponding upper dies 48. At their forward ends, the lower jaws carry two fixed die elements 86 (FIG. 7) mounted and positioned in correspondence with the specifically discussed upper die elements 50.

The two actuating units 21 and 22 for turning upper gripping assembly 18 relative to lower gripping assembly 19 include two piston and cylinder mechanisms whose cylinders are connected pivotally to certain of the jaws of the gripping assemblies, and whose pistons are connected to the two hinge connections of the gripping assemblies. More specifically, the cylinder 87 of unit 22 is connected to upper jaw body 26 for relative pivotal movement about the vertical axis 88 (FIGS. 4 and 12), by providing the cylinder with upper and lower trunnion shafts or stub shafts 89 journalled within two vertically spaced plates 90 and 91 which are rigidly secured to or formed integrally with jaw body 26. The piston 92 within cylinder 87 is pressure fluid actuable relative to the cylinder along an axis 93, and has a piston rod 94 carrying a connector part 95 containing a cylindrical opening 96 within which the upper extremity of hinge pin 74 is pivotally received. Pressure fluid is supplied to opposite ends of the cylinder 87 in any convenient manner, as by connecting a first supply line 97 (FIG. 12) to an upper one of the stub shafts 89, with a passage extending through the stub shaft to a first end of the cylinder, and connecting a second pressure fluid supply line 98, to the piston rod 84, and forming the piston rod to be hollow and conduct fluid through its interior to the opposite end of the cylinder and piston. The longitudinal axis 93 of the piston and cylinder mechanism 22 is horizontal and intersects and is perpendicular to the vertical axis 99 of hinge connection 73 (FIGS. 4 and 5).

Figure 12:
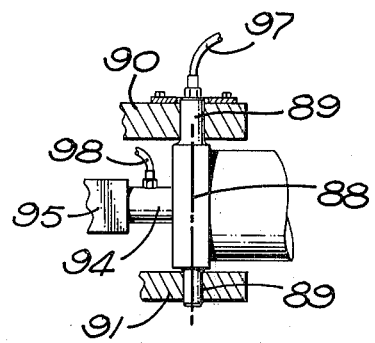
FIG. 12 is a fragmentary section taken primarily on line 12—12 of FIG. 4.

The second piston and cylinder mechanism 21 is constructed the same as unit 22, but located at the opposite side of the hinge connections, and has its cylinder 100 connected pivotally to jaw 71 of the lower gripping assembly by stub shafts similar to those shown in 89 in FIG. 12 connected pivotally into two vertically spaced horizontally extending mounting plates 101 and 102 rigidly attached to or formed integrally with the lower jaw 71. The piston rod of unit 21 carries a connector part 103 which is pivotally attached to the lower end of upper hinge pin 39, directly adjacent the previously discussed connector part 95 22 (see FIGS. 5 and 6). The pivotal axis 104 of the cylinder mounting trunnion assembly extends vertically and parallel to axis 88, and is perpendicular to and intersects the axis of longitudinal movement 105 of the piston 106 of unit 21. Horizontal axis 105 also perpendicularly intersects axis 40 of the upper hinge connection 29.

Pressure fluid is supplied to units 21 and 22 under the control of a valve 107 which can be actuated to move the pistons of units 21 and 22 in either direction, under the control of an actuating handle 108. A third handle 109 controls a valve 110 which applies pressure fluid to the two pistons for actuating the radially movable gripping dies 84 and 85 of the lower gripping assembly.

The suspension line 17 of FIGS. 1 and 6 for supporting the tool on a drill rig may be connected to a rigid support member 111 which extends at an inclination as shown to a point of pivotal connection at 112 to the upper end of a part 113 which extends downwardly at the rear side of the tool behind the two hinge connections 29 and 73. A screw 114 threadedly connected into a downwardly projecting portion 115 of member 111 may be adjustably engageable with a lug 116 on part 113 to enable adjustment of the tool to a position in which the openings through the two gripping assemblies extend directly vertically for engaging a vertical well pipe. At its lower end, member 113 carries the previously mentioned support plate 79, having a tubular boss portion 117 to which the lower end of the hinge pin 74 is connected. Extending across the underside of bottom jaws 71 and 72, the support plate 79 has an upwardly facing horizontal surface 118 on which the horizontal undersurfaces 119 of jaws 71 and 72 are slidably supported, in a manner allowing these jaws 71 and 72 to move between open and closed positions while supported by plate 79. Projecting downwardly from its undersurface, each of the jaws 71 and 72 has a motion limiting structure 120 slidably received within a coacting arcuate recess 121 and 122 (FIG. 9), to limit opening movement of the jaws in the FIG. 9 position and to limit closing movement of the jaws in the FIG. 4 position. As seen in FIG. 6, these structures 120 may include downwardly projecting screws 123 having lower enlarged heads supporting relatively rotatable bushing sleeves 124 which are relatively close sliding fits within the arcuate slots 121 and 122.

To further locate hinge pin 74 and the connected jaws relative to the supporting structure, part 113 may carry a bracket element 125, rigidly secured to member 113 by screws 126 or otherwise, and containing an opening 127 which receives and locates an upper portion of the hinge pin at a location between two of the hinge lugs of the lower jaws.

Figure 7:
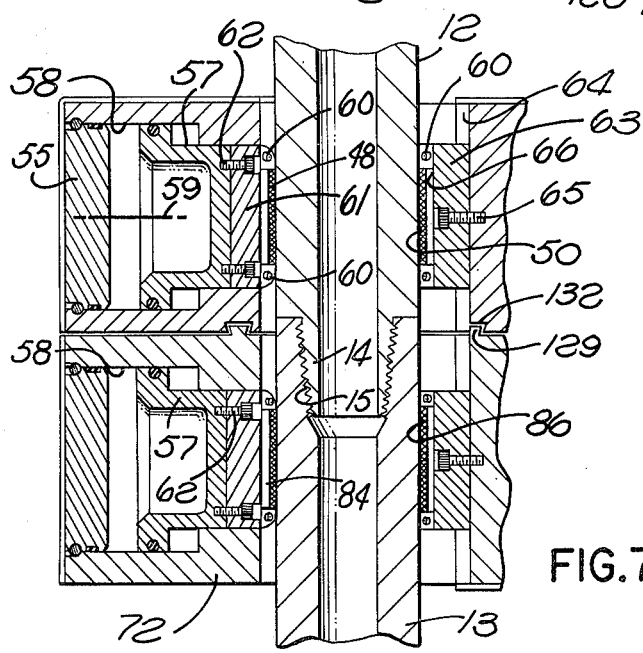
FIG. 7 is a fragmentary vertical section taken on line 7—7 of FIG. 4.

At their undersides, the two upper jaw bodies 25 and 26 have horizontal essentially planar undersurfaces 127 (FIG. 6), extending perpendicular to the pipe axis 20 and engaging the supported by corresponding horizontal upper surfaces 128 formed on the upper sides of the two lower jaws 71 and 72. Projecting upwardly from surfaces 128, lower jaws 71 and 72 have complementary semicircular ribs or projections 129, slidably received within similarly shaped complementary semicircular grooves 132 formed in the underside of upper jaw bodies 25 and 26. Ribs 129 and grooves 132 are of uniform cross section through their entire semi-circular extents, except that they may be partially interrupted at the locations of the forward fixed dies 50 as seen in FIG. 7. More particularly, the rib 129 of jaw 71, except as so interrupted, may be of uniform cross section from the location of a vertical planar surface 130 formed on jaw 71 at the back side of the pipe opening (FIG. 6) to the location of an aligned vertical planar surface 131 formed on the same jaw at the front of the pipe receiving opening (FIGS. 6 and 10). Similarly, groove 132, except as interrupted at dies 50, may have a uniform cross-section along its entire semi-circular extent between two vertical planar aligned surfaces 70 and 170 at the rear and front respectively of the pipe receiving opening. Desirably, the ribs 129 and the grooves 132 are of similar dovetail cross-section, as seen in FIG. 6, but preferably with substantial lateral clearance or looseness between the ribs and grooves to allow some limited relative horizontal shifting movement between the two jaws 25 and 71 and between jaws 26 and 72, while at the same time guiding the corresponding upper and lower jaws for primarily only rotary movement relative to one another about axis 20.

In placing the tool 16 of FIGS. 1 to 12 in use, assume first of all that the upper and lower assemblies are turned relative to one another to positions in which their hinge axes are in vertical alignment with one another (as in FIG. 9) and the upper and lower jaws are then both opened to the FIG. 9 condition so that the tool can be moved to a position about a vertical well pipe 11. After the tool has been shifted to the FIG. 9 position relative to the pipe, an operator actuates valve 107 to supply pressure fluid to the outer ends of actuating units 21 and 22 in parallel, so that the piston of unit 21 tends to move the upper hinge connection to the right as viewed in FIG. 1, and the piston of unit 22 tends to move the lower hinge connection to the left in that Figure. These hinge connections can not move in those directions, however, unless the jaws are first closed to the FIG. 4 positions in which the guide ribs 129 and the guide grooves 132 of the four jaws are all centered about a common axis. As a result, the first effect of the exertion of force by the pistons of units 21 and 22 against the hinge connections is to automatically close both the upper and lower jaws from the FIG. 9 position to the FIG. 4 position. During the final portion of this closing movement, the surfaces 38 of the two latch elements engage surfaces 37 of lugs 36 and 82, to cam the latch parts 32 and 80 radially outwardly along surfaces 37, and against the tendency of springs 35 and 83 of FIG. 8, to positions from which they ultimately fall into the latched condition of FIG. 8.

As soon as the jaws reach this latched condition, the operator actuates valve handle 108 to close valve 107 and thus cut off the supply of pressure fluid to units 21 and 22, following which the operator actuates the two valves 57 and 110 to supply pressure fluid to the outer ends of the cylinders controlling radially movable gripping dies 48, 49, 84, and 85, thereby actuating those dies radially inwardly against the pipes, and tightly gripping the two pipe sections within the upper and lower gripping assemblies respectively. By virtue of the unique relative positioning of the movable and fixed dies as illustrated in FIG. 4 and discussed in detail hereinabove, the two movable dies which are relatively close together circularly are able to effectively displace the engaged pipes laterally against the fixed dies such as elements 50 of FIG. 4. Further, the looseness in the sliding joints between the arcuate ribs 129 and grooves 132 enables slight lateral shifting movement of one set of jaws relative to the other to accommodate slightly different sizes of pipe or slightly worn pipe.

After the dies have been moved into gripping engagement with the two pipe sections, the operator then again actuates valve 107 in FIG. 8 to supply additional pressure fluid to the outer ends of the piston and cylinder actuating units 21 and 22, so that their pistons act through parts 95 and 103 to urge lower hinge pin 74 in a leftward direction as viewed in FIG. 5, and to urge the upper hinge pin rightwardly as viewed in that Figure. As a result, since the lower pipe normally is retained in the well in a manner preventing its rotation, the upper gripping assembly 18 and connected pipe 12 will usually turn in a counterclockwise direction as viewed in FIG. 3 relative to the lower gripping assembly and lower pipe 13, and from the FIG. 4 initial position to the positions illustrated in FIGS. 2 and 3. This limited rotary movement, say about fifteen degrees, is sufficient to break the tight threaded joint between the two pipes, so that they may thereafter be spun apart by other apparatus. After the joint is broken in this manner, the pressure fluid connections to units 21 and 22 may be reversed to turn the two gripping assemblies relative to one another back to the vertically aligned position of FIGS. 1 and 4, following which the latches may be released and the jaws may be manually opened to allow removal of the tool from about the pipe. In opening and closing the jaws, the interfitting semi-circular ribs and grooves effectively connect corresponding upper and lower jaws together so that an operator need only grasp and open or close two of the jaws relative to one another, and these jaws will carry with them the other two. Further, during the rotary movement for breaking a threaded connection, the interfitting ribs and grooves very positively maintain the coaxial centered relationship between the two gripping assemblies. As the upper jaws turn relative to the lower jaws from the FIG. 4 position toward the FIG. 3 position, the semi-circular rib at one side of the tool moves into the semicircular groove at the opposite side of the tool, to further enhance the manner in which all four of the jaws are retained in properly oriented relative positions.

In making a threaded connection, rather than breaking such a connection, the above discussed operation is in certain respects reversed, and in particular the tool is first turned to the position of FIGS. 2 and 3 before actuation of the radially movable gripping dies to their pipe holding positions, following which power actuation of the units 21 and 22 will positively turn the gripping assemblies and connected pipes relative to one another from the FIG. 3 position to the FIG. 4 position, to complete a final tightening motion of the pipes.

FIGS. 13 through 15 show a variational arrangement in which a tool of the type shown in FIGS. 1 to 12 has been adapted for use in making and breaking joints in a horizontally extending pipe, rather than a vertical pipe. In FIGS. 13 to 15, the tool 16 may be considered as in all respects identical to the tool of FIGS. 1 to 12, except for the addition of a confining and supporting cage or frame 137 in the back of the tool, and means 138 at the front of the tool for preventing relative axial separation of the two gripping assemblies at that location. In FIGS. 13 to 15, parts which are identical with the first form of the invention are designated by the same numbers as in FIGS. 1 to 12.

In the horizontal pipe arrangement of FIG. 13, the tool is turned on its side so that the pipe axis 20 extends horizontally, and the plate 79 which was at the bottom of the tool in FIG. 6 is located at the side of the tool. Frame 137 is rigidly attached to plate 79, and includes an upper horizontally extending member 139, a lower horizontally extending member 140, and two vertical member 141 and 241 at opposite sides of the tool. Member 141 has a planar inner surface parallel to the inner surface of plate 79 and slidably engaged by the gripping assembly 18 engaged by the jaws of gripping assembly 18, so that the two gripping assemblies 18 and 19 are effectively confined between plate 79 and member 141 in a manner allowing their relative opening and closing movement but preventing axial separation of the two gripping assemblies. The frame 137 may be supported from a suspension line 142 by a member 143 which may have a portion extending at an inclination sufficient to properly balance the tool in a desired orientation relative to the pipe.

The means 138 for holding the forward ends of the gripping assemblies against relative axial separation include a pair of rigid bars 144 connected to two of the jaws near their forward ends by screws 146 and having inturned ends 147 slidably engageable with transverse surfaces 148 on the other jaws to allow relative rotary movement of the two jaw assemblies about axis 20 while preventing axial separation of the assemblies. The jaws of FIGS. 13 to 15 also of course have arcuate guide ribs 149 and recesses 150 corresponding to ribs 129 and grooves 132 of the first form of the invention.

In using the apparatus of FIGS. 13 to 15, an operator suspends the tool adjacent the horizonntal pipe joint sections to be gripped, and pulls upwardly on the upper jaws by a tag line 145 (FIG. 13) to swing those jaws to positions in which the upper stop element 120 is in the upper portion of its coacting arcuate slot 122, while the lower jaws are urged by gravity downwardly until their stop element 120 is in the lower portion of its coacting arcuate groove 121. Thus, the jaws are in their fully open condition, in whcih main support line 142 can be moved laterally to shift the entire tool to a position of reception about the pipe. The operator then allows the upper jaws to fall downwardly until their stop element 120 is in the lower portion of slot 122 (see FIG. 14), and tag line 145 is actuated to pull the lower jaws upwardly to their closed position in which the latches will hold the jaws closed while a joint making or breaking operation is completed by actuation of the piston and cylinder mechanisms as previously discussed. The tag line or lines 145 may be connected to the jaws by handle loops 146 provided on the jaws as shown.

While certain specific embodiments of the invention have been shown and described, it will be understood that the invention is not limited to these particular arrangements, but rather includes also all variations falling within the scope of the appended claims.

We claim:
1. A tool for effecting relative rotation between two threaded pipes, comprising:
   a first gripping assembly adapted to extend about and grip a first of said pipes, and including two jaws and a first hinge connection attaching said jaws together for relative swinging movement between open and closed positions;
   a second gripping assembly adapted to extend about and grip a second of said pipes, and including two additional jaws and a second hinge connection attaching said additional jaws together for relative swinging movement between open and closed positions;
   power operated actuating means operable to exert force for turning one of said gripping assemblies relative to the other about a common axis to effect relative rotation between the pipes; and
   guide means carried by both of said jaws of each of said two gripping assemblies and operatively interfitting in a relation guiding the jaws of one assembly for rotary movement relative to corresponding jaws of the other assembly when moved by said actuating means in both of two opposite rotary directions.

2. A tool for effecting relative rotation between two threaded pipes, comprising:
   a first gripping assembly adapted to extend about the grip a first of said pipes, and including two jaws and a first hinge connection attaching said jaws together for relative swinging movement abut a first hinge axis between open and closed positions;
   a second gripping assembly adapted to extend about and grip a second of said pipes; and including two additional jaws and a second hinge connection attaching said additional jaws together for relative swinging movement about a second hinge axis between open and closed positions;
   a power operated actuating unit for exerting force in opposite directions against said two gripping assemblies in a relation causing relative rotation between the pipes;
   a first connection for transmitting actuating force from said unit to a perdetermined jaw of said first gripping assembly;
   a second connection for transmitting actuating force from said unit of said gripping assembly at essentially the location of said second hinge axis; and
   guide means carried by both of said jaws of each of said two gripping assemblies and operatively interfitting in a relation guiding the jaws of one assembly for rotary movement relative to corresponding to corresponding jaws of the other assembly when moved by said actuating means in both of two opposite rotary directions.

3. A tool as recited in claim 2, in which said guide means include interfitting essentially arcuate projection and groove means on corresponding jaws of the two gripping assemblies.

4. A tool as recited in claim 2, in whcih said actuating unit is a piston and cylinder mechanism.

5. A tool as recited in claim 2, including a second actuating unit connected to a jaw of said second gripping assembly and to said first gripping assembly at essentially said first hinge axis.

6. A tool for effecting relative rotation between two threaded pipes, comprising:
   a first gripping assembly adapted to extend about and grip a first of said pipes, and including two jaws and a first hinge connection attaching said jaws together for relative swinging movement between open and closed positions;
   a second gripping assembly adapted to extend about and grip a second of said pipes, and including two additional jaws and a second hinge connection attaching said additional jaws together for relative swinging movement between open and closed positions;
   power operated actuating means operable to exert force for turning one of said gripping assemblies relative to the other about a common axis to effect relative rotation between the pipes;
   a frame structure extending essentially about said two gripping assemblies at a location near said hinge connections in a relation retaining said assemblies against relative axial separation; and
   two connectors each carried by a jaw of one gripping assembly and slidably engaging a jaw of the other gripping assembly at a location spaced farther then said frame from said hinge connections and in a relation assisting in retaining said assemblies against axial separation.

7. A tool for effecting relative rotation between two threaded pipes, comprising:
   a first gripping assembly adapted to extend about and grip a first of said pipes, and including two jaws and a first hinge connection attaching said jaws together for relative swinging movement between open and closed positions;
   a second gripping assembly adapted to extend about and grip a second of said pipes, and including two additional jaws and a second hinge connection attaching said additional jaws together for relative swinging movement between open and closed positions;
   power operated actuating means operable to exert force for turning one of said gripping assemblies relative to the other about a common axis to effect relative rotation between the pipes; and
   interfitting guide means on the jaws of said two gripping assemblies guiding the jaws of one assembly for rotary movement relative to corresponding jaws of the other assembly in both of two opposite rotary directions;
   said guide means including an arcuate projection carried by one of said jaws of one gripping assembly and slidably received and guided within an arcuate groove in a corresponding jaw of the other gripping assembly.

8. A tool for effecting relative rotation between two threaded pipes, comprising:
   a first gripping assembly adapted to extend about and grip a first of said pipes, and including two jaws and a first hinge connection attaching said jaws together for relative swinging movement between open and closed positions;
   a second gripping assembly adapted to extend about and grip a second of said pipes, and including two additional jaws and a second hinge connection attaching said additional jaws together for relative swinging movement between open and closed positions;
   power operated actuating means operable to exert force for turning one of said gripping assemblies relative to the other about a commn axis to effect relative rotation between the pipes; and
   interfitting guide means on the jaws of said two gripping assemblies guiding the jaws of one assembly for rotary movement relative to corresponding jaws of the other assembly in both of two opposite rotary directions;
   said guide means including a guide projection carried by a jaw of one of said gripping assemblies and projecting axially into an axially facing guide groove in a corresponding jaw of the other gripping assembly.

9. A tool for effecting relative rotation between two threaded pipes, comprising:
   a first gripping assembly adapted to extend about and grip a first of said pipes, and including two jaws and a first hinge connection attaching said jaws together for relative swinging movement between open and closed positions;
   a second gripping assembly adapted to extend about and grip a second of said pipes, and including two additional jaws and a second hinge connection attaching said additional jaws together for relative swinging movement between open and closed positions;
   power operated actuating means operable to exert force for turning one of said gripping assemblies relative to the other about a common axis to effect relative rotation between the pipes; and
   interfitting guide means on the jaws of said two gripping assemblies guiding the jaws of one assembly for rotary movement relative to corresponding jaws of the other assembly in both of two opposite rotary direction;
   said guide means including essentially arcuate projections formed on the jaws of one of said gripping assemblies and projecting axially into axially facing essentially arcuate guide grooves in the jaws of the other gripping assembly.

10. A tool for effecting relative rotation between two threaded pipes, comprising:
    a first gripping assembly adapted to extend about and grip a first of said pipes, and including two jaws and a first hinge connection attaching said jaws together for relative swinging movement between open and closed positions;
    a second gripping assembly adatped to extend about and grip a second of said pipes, and including two additional jaws and a second hinge connection attaching said additional jaws together for relative swinging movement between open and closed positions;
    power operated actuating means operable to exert force for turning one of said gripping assemblies relative to the other about a common axis to effect relative rotation between the pipes; and
    interfitting guide means on the jaws of said two gripping assemblies guiding the jaws of one assembly for rotary movement relative to corresponding jaws of the other assembly in both of two opposite rotary directions;

said guide means including a guide element which is carried by a jaw of one of said gripping assemblies, and which in one relative rotary positions of the gripping assemblies interfits with a predetermined correspondng jaw of the other gripping assembly, but not with a second jaw of said other assembly, and which guide element is movable into interfitting guiding relation with respect to said second jaw of said other gripping assembly upon relative rotary movement of the two assemblies about said axis.

11. A tool for effecting relative rotation between two threaded pipes, comprising:

a first gripping assembly adapted to extend about and grip a first of said pipes, and including two jaws and a first hinge connection attaching said jaws together for relative swinging movement between open and closed positions;

a second gripping assembly adapted to extend about and grip a second of said pipes, and including two additional jaws and a second hinge connection attaching said additional jaws together for relative swinging movement between open and closed positions;

power operated actuating means operable to exert force for turning one of said gripping assemblies relative to the other about a common axis to effect relative rotation between the pipes; and intefitting guide means on the jaws of said two gripping assemblies guiding the jaws of one assembly for rotary movement relative to corresponding jaws of the other assembly in both of two opposite rotary directions;

each of said jaws of said first gripping assembly being circularly coextensive about said axis with a corresponding jaw of said second gripping assembly in a predetermined relative rotary position of the assemblies in which said jaws are free for opening and closing movement;

said interfitting guide means including guide elements on the individual jaws each of which interfits only with the guide element of a corresponding jaw of the other gripping assembly when said assemblies are in said predetermined relative position, but moves circularly into interfitting relation with another non-corresponding jaw of said other gripping assembly when said two assemblies are turned about said axis to a different relative rotary positon.

12. A tool for effecting relative rotation between two threaded pipes, comprising:

a first gripping assembly adapted to extend about and grip a first of said pipes, and including two jaws and a first hinge connection attaching said jaws together for relative swinging movement between open and closed positions;

a second gripping assembly adapted to extend about and grip a second of said pipes, and including two additional jaws and a second hinge connection attaching said additional jaws together for relative swinging movement between open and closed positions;

power operated actuating means operable to exert force for turning one of said gripping assemblies relative to the other about a common axis to effect relative rotation between the pipes; and interfitting guide means on the jaws of said two gripping assemblies guiding the jaws of one assembly for rotary movement relative to corresponding jaws of the other assembly in both of two opposite rotary directions;

said jaws of said first gripping assembly coextensive circularly with corresponding jaws respectively of said second gripping assembly when those assemblies are in a predetermined position in which said hinge connections are axially aligned and the jaws of the two assemblies are openable in unison;

said guide means including arcuate projections formed on the jaws of one of said gripping assemblies and projecting axially into arcuate grooves formed in the jaws of the other gripping assembly;

each of said porjections being received within the groove of only a corresponding one of the jaws of the other gripping assembly when said assemblies are in said predetermined relative rotary position, but being movable arcuately into guided reception within the groove of a second of the jaws of said other gripping assembly upon relative rotation of the assemblies from said predetermined position.

13. A tool for effecting relative rotation between two threaded pipes, comprising:

a first gripping assembly adapted to extend about and grip a first of said pipes, and including two jaws and a first hinge connection attaching said jaws together for relative swinging movement about a first hinge axis between open and closed positions;

a second gripping assembly adapted to extend about and grip a second of said pipes, and including two additional jaws and a second hinge connection attaching said additional jaws together for relative swinging movement about a second hinge axis between open and closed positions;

a power operated actuating unit for exerting force in opposite directions against said two gripping assemblies in a relation causing relative rotation between the pipes;

a first connection for transmitting actuating force from said unit to a predetermined jaw of said first gripping assembly;

a second connection for transmitting actuating force from said actuating unit to said second gripping assembly at essentially the location of said second hinge axis; and interfitting guide means on the jaws of said two gripping assemblies guiding the jaws of one assembly for rotary movement relative to corresponding jaws of the other assembly in both of two opposite rotary directions;

said guide means including arcuate projections formed on the jaws of one of said assemblies and projecting axially into axially facing arcuate grooves in the jaws of the other gripping assembly in rotary guiding relation.

14. A tool for effecting relative rotation between two threaded pipes, comprising:

a first gripping assembly adapted to extend about and grip a first of said pipes, and including two jaws and a first hinge connection attaching said jaws together for relative swinging movement about a first hinge axis between open and closed positions;

a second gripping assembly adapted to extend about and grip a second of said pipes, and including two additional jaws and a second hinge connection attaching said additional jaws together for relative swinging movement about a second hinge axis between open and closed positions;

a first power operated actuating unit for exerting force in opposite directions against said two gripping assemblies in a relation causing relative rotation between the pipes;

a first connection for transmitting actuating force from said unit to a predetermined jaw of said first gripping assembly;

a second connection for transmitting actuating force from said actuating unit to said second gripping assembly at essentially the location of said second hinge axis;

interfitting guide means on the jaws of said two gripping assemblies guiding the jaws of one assembly for rotary movement relative to corresponding jaws of the other assembly in both of two opposite rotary directions;

said first actuating unit being a piston and cylinder mechanism having a cylinder connected by said first connection to a jaw of said first gripping assembly, and having a piston connected by said second connection to said second hinge connection; and a second piston and cylinder actuating unit having a cylinder connected to a jaw of said second gripping assembly and having a piston connected to said first hinge connection;

said guide means including arcuate projections formed on the jaws of one of said gripping assemblies and projecting into arcuate guiding grooves in the other of said gripping assemblies;

each of said projections being received within a groove of only one corresponding jaw in a predetermined relative rotary position of the gripping assemblies in which said jaws are openable, and being movable into a groove of another jaw in a different relative rotary position of the assemblies.

15. A tool for effecting relative rotation between two threaded pipes, comprising:
a first gripping assembly adapted to extend about and grip a first of said pipes, and including two jaws and a first hinge connection attaching said jaws together for relative swinging movement between open and closed positions;

a second gripping assembly adapted to extend about and grip a second of said pipes, and including two additional jaws and a second hinge connection attaching said additional jaws together for relative swinging movement between open and closed positions;

power operated actuating means operable to exert force for turning one of said gripping assemblies relative to the other about a common axis to effect relative rotation between the pipes;

a structure for supporting said gripping assemblies and including a support plate axially adjacent said second gripping assembly;

means attaching said second hinge connection to said plate in a relation maintaining a hinge axis of said second hinge connection essentially fixed relative to said plate; and stop means on said plate for limiting the opening and closing swinging movement of said additional jaws relative to said plate and between open and closed positions;

said plate being axially adjacent and slidably engaged by the jaws of said second gripping assembly;

said stop means including two arcuate guideways formed in said plate and centered about said axis of the second hinge connection, and lugs on said two jaws of the second gripping assembly slidably received in said guideways respectively to limit said swinging movement of said jaws.

16. A tool as recited in claim 15, including a frame connected to said plate and extending about both of said gripping assemblies and retaining said assemblies against movement relatively axially apart.

17. A tool as recited in claim 15, including a frame connected to said plate and extending about both of said gripping assemblies at a location near said hinge connections in a relation retaining said assemblies against movement relatively axially apart, and means retaining said assemblies against relative axial separation at a location farther than said frame from said hinge connections while permitting relative rotary movement of the gripping assemblies and opening and closing movement of the jaws.

18. A tool as recited in claim 15, including a frame connected to said plate and extending about both of said gripping assemblies at a location near said hinge connections in a relation retaining said assemblies against movement relatively axially apart, and two connectors each carried by a jaw of one gripping assembly and slidably engaging a jaw of the other gripping assembly at a location spaced farther than said frame from said hinge connections and in a relation assisting in retaining said assemblies against axial separation.

19. A tool for effecting relative rotation between two threaded pipes about an axis of said pipes, comprising:
two gripping assemblies adapted to extend about and grip said two pipes respectively, and each including two jaws, a hinge connection attaching said jaws together pivotally near first ends thereof for relative swinging movement between a closed position in which second ends of said jaws are near one another and an open position in which said second ends are spaced apart far enough to pass a pipe therebetween, and latch means for retaining said second ends of the jaws in closed position; and a power operated actuating unit for exerting force in opposite directions against said two gripping assemblies in a relation causing relative rotation between the pipes;

each of said gripping assemblies having two movable pipe gripping die structures carried by the two jaws respectively of said assembly near said hinge connection therebetween, two powered operating units for actuating said die structures respectively radially inwardly and outwardly relative to said jaws by which they are carried and relative to said pipe axis and between pipe gripping and released positions, and two additional gripping die elements carried by said two jaws respectively near said second ends thereof and essentially fixed against radial movement relative to the carrying jaws;

said two radially movable die structures of a particular one of said gripping assemblies being spaced circularly from one another a distance which is smaller than the circular spacing between each of said radially movable die structures and said additional gripping die element carried by the same jaw.

20. A tool as recited in claim 19, in which said radially movable die structures have their centers spaced apart circularly approximately ninety degrees.

* * * * *